(12) United States Patent
Jakubik et al.

(10) Patent No.: US 9,201,971 B1
(45) Date of Patent: Dec. 1, 2015

(54) GENERATING AND USING SOCIALLY-CURATED BRAINS

(71) Applicant: Brainspace Corporation, Dallas, TX (US)

(72) Inventors: Paul A. Jakubik, Plano, TX (US); David Adam Hagar, Dallas, TX (US); David S. Copps, Dallas, TX (US)

(73) Assignee: Brainspace Corporation, Dallas, TX (US)

( * ) Notice: Subject to any disclaimer, the term of this patent is extended or adjusted under 35 U.S.C. 154(b) by 0 days.

(21) Appl. No.: 14/592,713

(22) Filed: Jan. 8, 2015

(51) Int. Cl.
*G06F 17/30* (2006.01)

(52) U.S. Cl.
CPC .............................. *G06F 17/30867* (2013.01)

(58) Field of Classification Search
USPC ................................................ 707/706, 722
See application file for complete search history.

(56) References Cited

U.S. PATENT DOCUMENTS

| | | | | |
|---|---|---|---|---|
| 6,586,203 | B1* | 7/2003 | Sherr et al. .................... | 435/69.1 |
| 8,032,508 | B2* | 10/2011 | Martinez et al. .............. | 707/708 |
| 8,060,492 | B2* | 11/2011 | Nair et al. ...................... | 707/709 |
| 8,407,238 | B2* | 3/2013 | Trevor et al. ................... | 707/763 |
| 8,527,450 | B2* | 9/2013 | Jain et al. ....................... | 706/54 |
| 8,621,376 | B2* | 12/2013 | Kim et al. ....................... | 715/771 |
| 8,788,516 | B1* | 7/2014 | Jakubik ......................... | 707/758 |
| 8,793,593 | B2* | 7/2014 | Rasmussen et al. .......... | 715/753 |
| 2010/0114890 | A1* | 5/2010 | Hagar et al. ................... | 707/737 |
| 2012/0042020 | A1* | 2/2012 | Kolari et al. ................... | 709/206 |

\* cited by examiner

*Primary Examiner* — Kim Nguyen
(74) *Attorney, Agent, or Firm* — Baker Botts L.L.P.

(57) ABSTRACT

A method includes determining a plurality of social objects, each social object having a link to a link object on a network. The method further includes applying a filter to the determined social objects in order to determine a plurality of filtered social objects, retrieving a copy of each of the link objects linked to by the plurality of filtered social objects, and generating, using the retrieved copies of the link objects linked to by the plurality of filtered social objects, a matrix comprising a plurality of vectors. The method further includes generating a singular value representation of the matrix by performing Singular Value Decomposition (SVD) on the matrix and storing the singular value representation of the matrix in one or more memory units.

18 Claims, 5 Drawing Sheets

GENERATING AND USING SOCIALLY-CURATED BRAINS

TECHNICAL FIELD

This disclosure relates in general to searching of data and more particularly to generating and using socially-curated brains.

BACKGROUND

Latent Semantic Analysis ("LSA") is a modern algorithm that is used in many applications for discovering latent relationships in data. In one such application, LSA is used in the analysis and searching of text documents. Given a set of two or more documents, LSA provides a way to mathematically determine which documents are related to each other, which terms in the documents are related to each other, and how the documents and terms are related to a query. Additionally, LSA may also be used to determine relationships between the documents and a term even if the term does not appear in the document.

LSA utilizes Singular Value Decomposition ("SVD") to determine relationships in the input data. Given an input matrix representative of the input data, SVD is used to decompose the input matrix into three decomposed matrices. LSA then creates compressed matrices by truncating vectors in the three decomposed matrices into smaller dimensions. Finally, LSA analyzes data in the compressed matrices to determine latent relationships in the input data.

SUMMARY OF THE DISCLOSURE

According to one embodiment, a method includes determining a plurality of social objects, each social object comprising a link to a link object on a network. The method further includes applying a filter to the determined social objects in order to determine a plurality of filtered social objects, retrieving a copy of each of the link objects linked to by the plurality of filtered social objects, and generating, using the retrieved copies of the link objects linked to by the plurality of filtered social objects, a matrix comprising a plurality of vectors. The method further includes generating a singular value representation of the matrix by performing Singular Value Decomposition (SVD) on the matrix and storing the singular value representation of the matrix in one or more memory units.

Technical advantages of certain embodiments may include using a singular value representation of a socially-curated matrix in order to perform queries to locate people with similar interests to a particular person or to locate documents, images, webpages, or other content on a network related to the query. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

On a network such as the Internet or a private corporate network, a person may post a social object that includes a link to another object on the network. As one example, a person may post a message via TWITTER (i.e., a "tweet") that includes a link to another webpage or document on the Internet. As another example, an employee of a corporation may post a message to the corporation's private network that includes a link to another document on the corporate network.

The teachings of the disclosure recognize that documents such as webpages that are linked to by tweets and other social objects may provide valuable socially-curated information that may be used to provide better results to a user's query. Documents that are linked to by social objects may be more valuable than a bulk corpus of un-curated documents because other people have reviewed and selected which documents to share with others. The documents linked to by certain social objects may be retrieved, processed, and used to generate one or more socially-curated "brains." These socially-curated brains may then be used to provide more accurate and relevant results to a user's query and may require less time and computer processing power to analyze than the corpus as a whole. The following describes systems and methods of generating and using socially-curated brains for providing these and other desired features.

Figure 1:
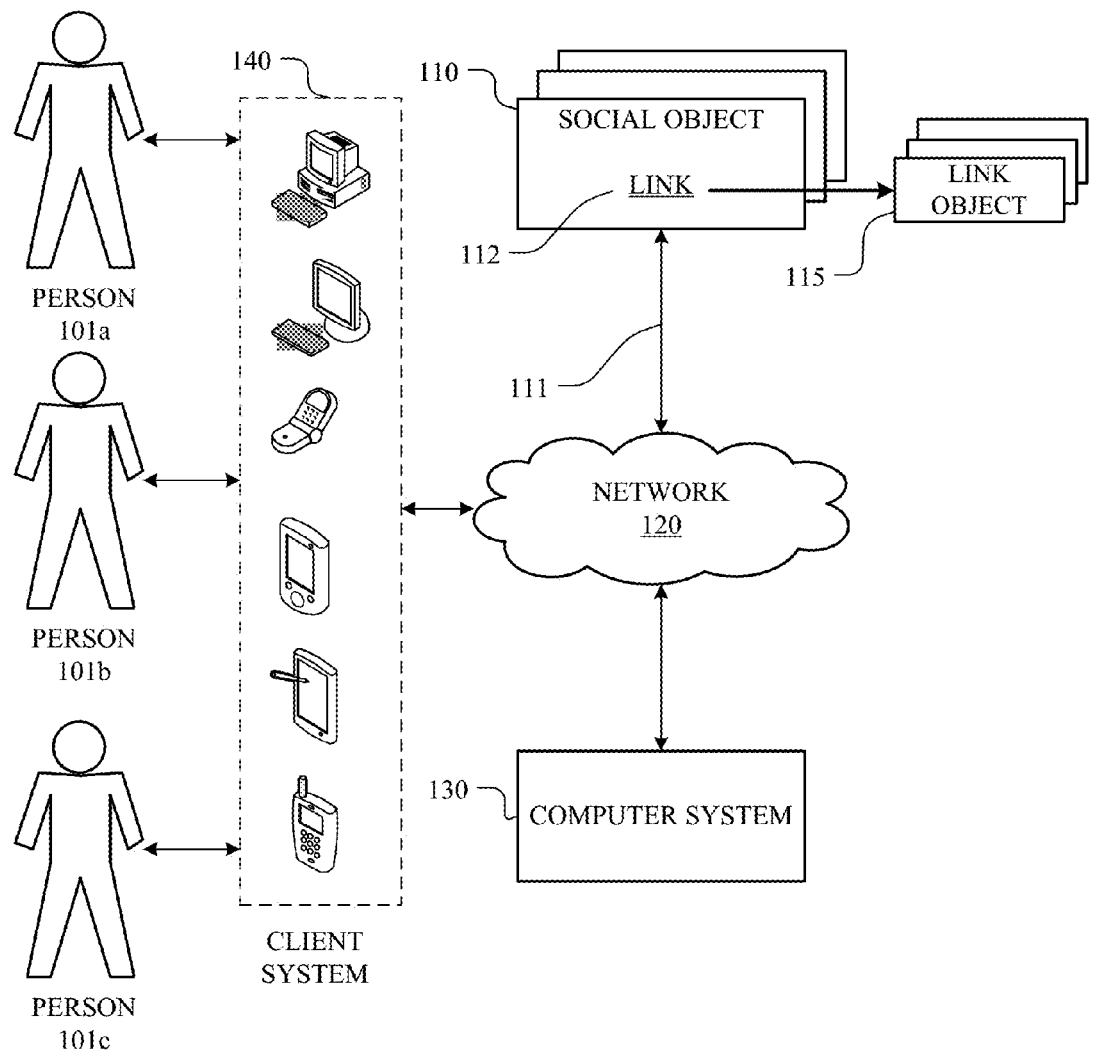
FIG. 1 illustrates a system for generating and using socially-curated brains, according to certain embodiments.

FIG. 1 illustrates a system 100 for generating and using socially-curated brains, according to certain embodiments. System 100 includes people 101 (i.e., person 101a-101c), social objects 110, a network 120, a computer system 130, and client systems 140. Some social objects 110 include one or more links 112. Each link 112 is a reference such as a hyperlink that points to a particular link object 115 that is available via network 120. People 101 utilize client systems 140 to generate one or more of the social objects 110 via network 120. Network 120 communicatively couples social objects 110, link objects 115, client systems 140, and computer system 130.

In general, people 101 generate social objects 110 using client systems 140 and network 120. As one example, person 101a utilizes a particular client system 140 such as a smartphone to post a tweet 110 to TWITTER. As another example, person 101b utilizes a particular client system 140 such as a personal computer to post a message 110 to corporate network 120. Some social objects 110 (e.g., tweets 110 and messages 110) contain one or more links 112 to link objects 115. Computing system 130 analyzes social objects 110 and retrieves certain link objects 115 that are linked to by certain social objects 110. Computing system 130 utilizes the retrieved link objects 115 to build a matrix such as TDM 325 described below. Computer system 130 then utilizes the generated matrix to build a socially-curated brain, which is a reduced singular-value representation of the generated matrix. Once the socially-curated brain is built, it may be utilized by computer system 130 to generate results to a query of a person 101. Because the results to the query are generated using socially-curated information, they may be more relevant and useful than results generated using information that is not socially-curated.

Social objects 110 may be any data objects that are generated by people 101 and are accessible via network 120 by other people 101. In some embodiments, social objects 110 may be uniquely identified and that uniquely identifiable people 101 can interact with. Examples and details of data objects, social objects, and social interactions are described in more detail in U.S. patent application Ser. No. 13/841,971 (Pub. No. US 2014/0280558; "Generating and Using Social Brains") which is incorporated herein by reference in its entirety. In some embodiments, social objects 110 are any user-generated content on a social-networking website such as TWITTER, FACEBOOK, REDDIT, TUMBLR, and the like. Examples of social objects 110 include, but are not limited to, one or more of the following:

- tweets
- messages
- posts
- documents
- emails
- web pages
- blogs
- microblogs
- articles
- any user interaction with a web application. These can be positive interactions (read, save, share) or negative interactions (delete, ignore, etc.)
- the lack of interaction with social objects 110 offered to a user of a web application. This is a way of obtaining a social interaction without the user taking a specific action.
- social interactions from services other than TWITTER. For example, social object sharing on FACEBOOK, LINKEDIN, or other social services.
- social interaction data from link shortening services. (Sharing and viewing information can be gathered from these sources.)
- watching users browsing behavior using plugins. (This could be at a user's request, or by company policy for enterprise customers.)
- Data from read-later services.

People 101 can interact with social objects 110 of other people 101 in any available manner. In some embodiments, people 101 can interact with other social objects in a positive or negative manner. For example, positive interactions with social objects 110 may include a person 101 retweeting a tweet 110 of another person 101, a person 101 up-voting a post 110 of another person 101, a person 101 liking a post 110 of another person 101, a person 101 sharing a post 110 of another person 101, or any other available interaction that indicates a positive opinion of social object 110. Examples of negative interactions with social objects 110 may include a person 101 down-voting a post 110 of another person 101, or any other available interaction that indicates a negative opinion of social object 110.

In some embodiments, social objects 110 are retrieved using a data feed 111 via network 120. In some embodiments, data feed 111 may be a stream of data from a social-networking website such as TWITTER and FACEBOOK. Data feed 111 may be retrieved using any mechanism to retrieve bulk data from public data sources. In some embodiments, data feed 111 may be accessed using an application programming interface (API). In some embodiments, data feed 111 may be a Rich Site Summary (RSS) feed. In some embodiments, data feed 111 may be a web feed. As an example for illustrative purposes only, tweets 110 may be retrieved via TWITTER'S filtered public data stream or TWITTER'S unfiltered public data stream (i.e., "firehose"). In this example, tweets 110 from the filtered public data stream may be certain tweets 110 from certain TWITTER users (e.g., certain tweets 110 from the top forty thousand connected TWITTER users) and tweets 110 from the unfiltered public data stream may be the tweets 110 from all TWITTER users.

Links 112 may be any appropriate reference that points to link objects 115. In some embodiments, links 112 are hyperlinks that point to link objects 115. Each social object 112 may include none, one, or more than one link 112.

Link objects 115 may be any data object available via network 120. Examples of link objects 115 include textual data objects such as webpages, Portable Document Format (PDF) documents, text documents such as MICROSOFT WORD documents, posts to social-media websites such as TWITTER and FACEBOOK, and the like. In some embodiments, link objects may be non-textual data objects such as videos, music, and images. Non-textual link objects 115 are discussed in more detail below. Link objects 115 may be retrieved via network 120 using links 112.

Network 120 may refer to any interconnecting system capable of transmitting audio, video, signals, data, messages, or any combination of the preceding. Network 120 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet such as a corporate network, or any other suitable communication link, including combinations thereof. One or more portions of one or more of these networks may be wired or wireless. Example wireless networks 120 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

Computer system 130 may be any suitable computing system in any suitable physical form. As example and not by way of limitation, computer system 130 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 130 may include one or more computer systems 130; be unitary or distributed; span multiple locations; span multiple machines; or reside in a cloud, which may include one or more cloud components in one or more networks. Where appropriate, one or more computer systems 130 may perform without substantial spatial or temporal limitation one or more steps of one or more methods described or illustrated herein. As an example and not by way of limitation, one or more computer systems 130 may perform in real time or in batch mode one or more steps of one or more methods described or illustrated herein. One or more computer systems 130 may perform at different times or at different locations one or more steps of one or more methods described or illustrated herein, where appropriate. A particular embodiment of computer system 130 is described in more detail below in reference to FIG. 5.

Client system 140 may be any electronic device including hardware, software, or embedded logic components or a combination of two or more such components and capable of carrying out the appropriate functionalities implemented or supported by client system 140. As an example and not by way of limitation, a client system 140 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 140. A client system 140 may enable person 101 to access network 120 and generate and/or interact with social objects 110.

In particular embodiments, client system 140 may include a web browser, such as MICROSOFT INTERNET EXPLORER, GOOGLE CHROME, or MOZILLA FIREFOX, and may have one or more add-ons, plug-ins, or other extensions. A user of client system 140 may enter a Uniform Resource Locator (URL) or other address directing the web browser to a particular server, and the web browser may generate a Hyper Text Transfer Protocol (HTTP) request and communicate the HTTP request to server. The server may accept the HTTP request and communicate to client system 140 one or more Hyper Text Markup Language (HTML) files responsive to the HTTP request. Client system 140 may render a webpage based on the HTML files from the server for presentation to person 101. Person 101 may then interact with the webpage by, for example, posting a message in response to content rendered on the webpage.

Figure 2:
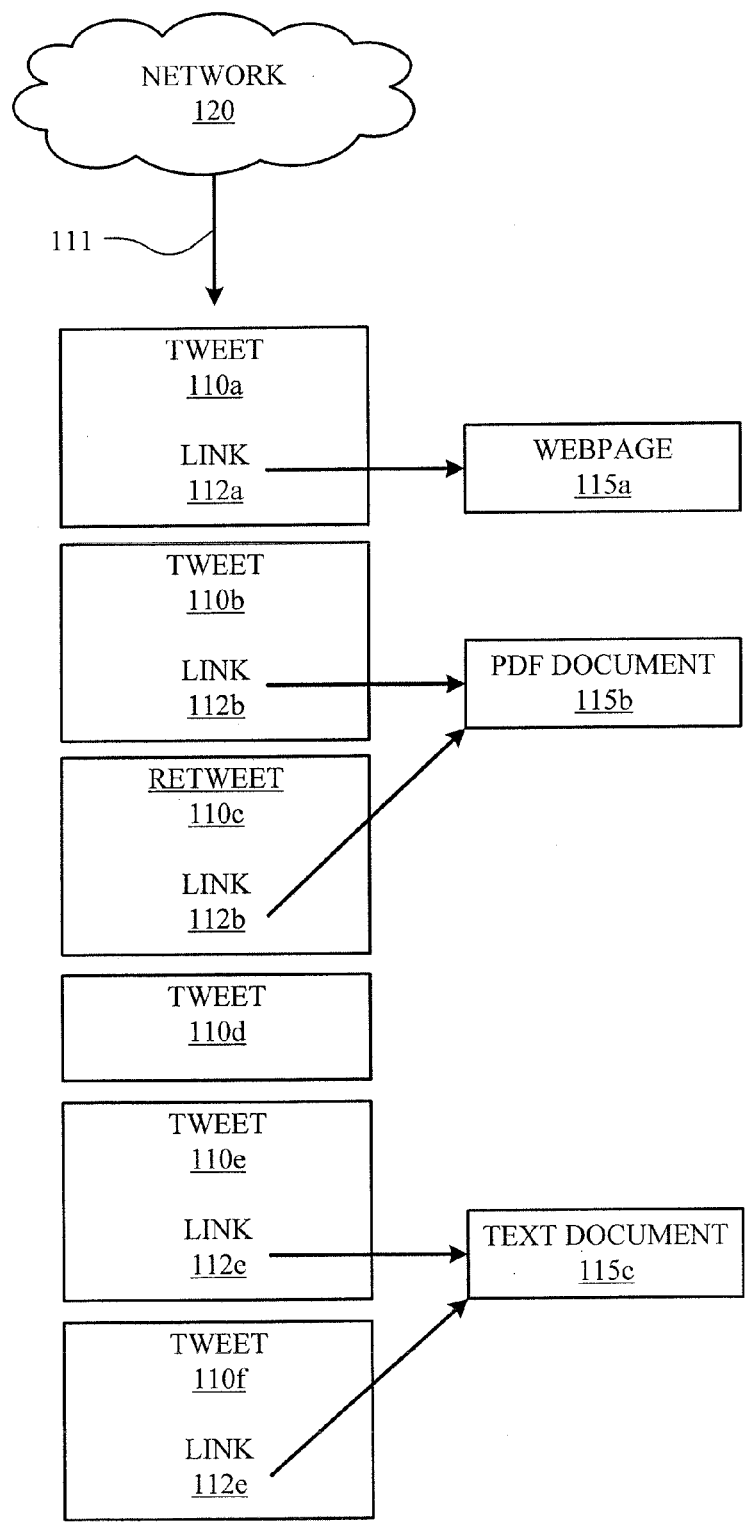
FIG. 2 illustrates an example of the social objects of FIG. 1, according to certain embodiments.

FIG. 2 illustrates an example data stream 111 of social objects 110 of FIG. 1. In this example, data stream 111 includes at least six social objects 110: tweets 110a, 110b, 110d, 110e, and 110f, and retweet 110c. Tweet 110a includes a link 112a to webpage 115a, both tweet 110b and retweet 110c include links 112b to PDF document 115b, and tweets 110e and 110f include links 112e to text document 115c. Tweet 110d does not include any links 112. While a specific number of social objects 110, links 112, and link objects 115 are illustrated in FIG. 2, other embodiments may have any number of social objects 110, links 112, and link objects 115.

In some embodiments, data stream 111 includes social objects 110 that have been pre-filtered to meet a specific criteria before they are received by computer system 130. For example, social objects 110 of data stream 111 may be pre-filtered according to criteria received from computer system 130 to only include social objects 110 of the topmost connected users of a social-networking system. As a specific example, social objects 110 of data stream 111 may be the tweets of the top N users of TWITTER as measured by number of connections or by number of tweets. N may be any number such as 1,000 or 40,000 or any percentage such as ten percent. Any appropriate number may be used. In some embodiments, social objects 110 of data stream 111 may be pre-filtered to only include social objects 110 with links 112. In some embodiments, computer system 130 may receive data stream 111 that includes the pre-filtered social objects 110 and may use the social objects 110 without further filtering to generate one or more socially-curated brains such as socially-curated brains 360 discussed below. In other embodiments, computer system 130 my apply one or more filters discussed below to further refine which social objects 110 to use to generate the one or more socially-curated brains 360.

In some embodiments, data stream 111 includes a raw feed of un-filtered social objects 110. That is, social objects 110 of data stream 111 are not filtered before they are sent to computer system 130. For example, data stream 111 may include all tweets 110 from all TWITTER users or all posts 110 from all FACEBOOK users. In such an embodiment, computer system 130 may receive data stream 111 that includes the un-filtered social objects 110 and then filter which social objects 110 to keep and analyze further. For example, computer system 130 may select only those social objects 110 from un-filtered data stream 111 that include one or more links 112. Further examples of filtering of social objects 110 are discussed below. This disclosure anticipates one or more filtering operations on social objects 110 before and/or after social objects 110 are received at computer system 130.

In operation of example embodiments, socially-curated brains 360 are generated and used to provide improved search results to user queries. To do so, some embodiments first determine one or more social objects 110. In some embodiments, social objects 110 are received at computer system 130 via network 120. Social objects 110 may be received via data feed 111 or may be retrieved or received using any other appropriate manner. The social objects 110 received at computer system 130 may be pre-filtered according to certain criteria or may be un-filtered. In either case, computer system 130 may perform further filtering on the received social objects 110 in order to determine filtered social objects 110, as described below.

In some embodiments, social objects 110 are filtered before and/or after they are received by computer system 130 to select only those social objects 110 that have a link 112 to a link object 115 on a network 120. In the illustrated embodiment of FIG. 2, for example, tweet 110a, tweet 110b, retweet 110c, tweet 110e, and tweet 110f each contain a link 112 and therefore would be selected using such a filter. Because tweet 110d does not contain a link 112, it would be discarded and not used.

In some embodiments, social objects 110 are filtered before and/or after they are received by computer system 130 to select social objects 110 that have been re-posted or re-blogged a certain number of times. For example, if social objects 110 are tweets, only those tweets 110 that have been retweeted a certain number of times may be selected. As another example, if social objects 110 are blogs (e.g., microblog), only those blogs 110 that have been re-blogged a certain number of times may be selected. In some embodiments, the number of required re-posts or re-blogs of a social object 110 may be one, ten, one hundred, one thousand, any number between these numbers, or any other appropriate number of re-posts or re-blogs.

In some embodiments, social objects 110 are filtered before and/or after they are received by computer system 130 to select social objects 110 that have links 112 to link objects 115 that have been linked to in other social objects 110 a predetermined number of times. In the illustrated embodiment of FIG. 2, for example, PDF document 115b was linked to by two social objects 110: tweet 110b and retweet 110c, and text document 115c was linked to by two social objects 110: tweets 110e and 110f. In this example, if a filter was applied to only select social objects 110 that include links 112 to link objects 115 that have been linked to more than one time, then tweets 110b, 110e, and 110f and retweet 110c would be selected. Any appropriate number of required links 112 to a linked object 115 may be used.

In some embodiments, social objects 110 are filtered before and/or after they are received by computer system 130 to select social objects 110 that have been up-voted or liked a predetermined number of times. As discussed above, some people 101 may have either a positive or negative interaction with social objects 110. Some embodiments may filter social objects 110 to select only those social objects 110 that have a predetermined number of positive interactions. As a specific example, only posts 110 to a social-networking website such as FACEBOOK that have links 112 and have been liked a certain number of times may be selected. As another specific example, only posts 110 to a social-networking website such as REDDIT that have links 112 and have been up-voted a certain number of times may be selected.

In some embodiments, social objects 110 are filtered before and/or after they are received by computer system 130 to select social objects 110 that have been shared a predetermined number of times. As a specific example, only posts 110 to a social-networking website such as FACEBOOK that have links 112 and have been shared with other users a certain number of times may be selected.

In some embodiments, social objects 110 are filtered before and/or after they are received by computer system 130 to select social objects 110 that are associated with a pre-defined topmost percentage of users of a social network according to number of social connections within the social network or the amount of interaction with the social-network (e.g., the number of social objects 110 posted to the social-network). For example, only tweets 110 from the top twenty percent of TWITTER users according to the number of connections to other TWITTER users may be selected. Any other appropriate percentage may be used.

In some embodiments, social objects 110 are filtered before and/or after they are received by computer system 130 to select social objects 110 that are associated with a pre-defined topmost number of users of a social network according to number of social connections within the social network or the amount of interaction with the social-network (e.g., the number of social objects 110 posted to the social-network). For example, only tweets 110 from the top forty thousand TWITTER users according to the number of connections to other TWITTER users may be selected. Any other appropriate number may be used.

After social objects 110 have been filtered according to a selected criteria, the filtered social objects 110 may then be used to begin building one or more socially-curated brains 360. To do so, a copy of each of the link objects 115 that are linked to by the filtered social objects 110 are retrieved. As an example, computer system may follow each of the links 112 in the filtered social objects 110 in order to retrieve and store the link objects 115 in one or more memory units accessible to computer system 130. Using the illustrated embodiment of FIG. 2, links 112a, 112b, and 112e would be followed in order to retrieve and store webpage 115a, PDF document 115b, and text document 115c.

Figure 3:
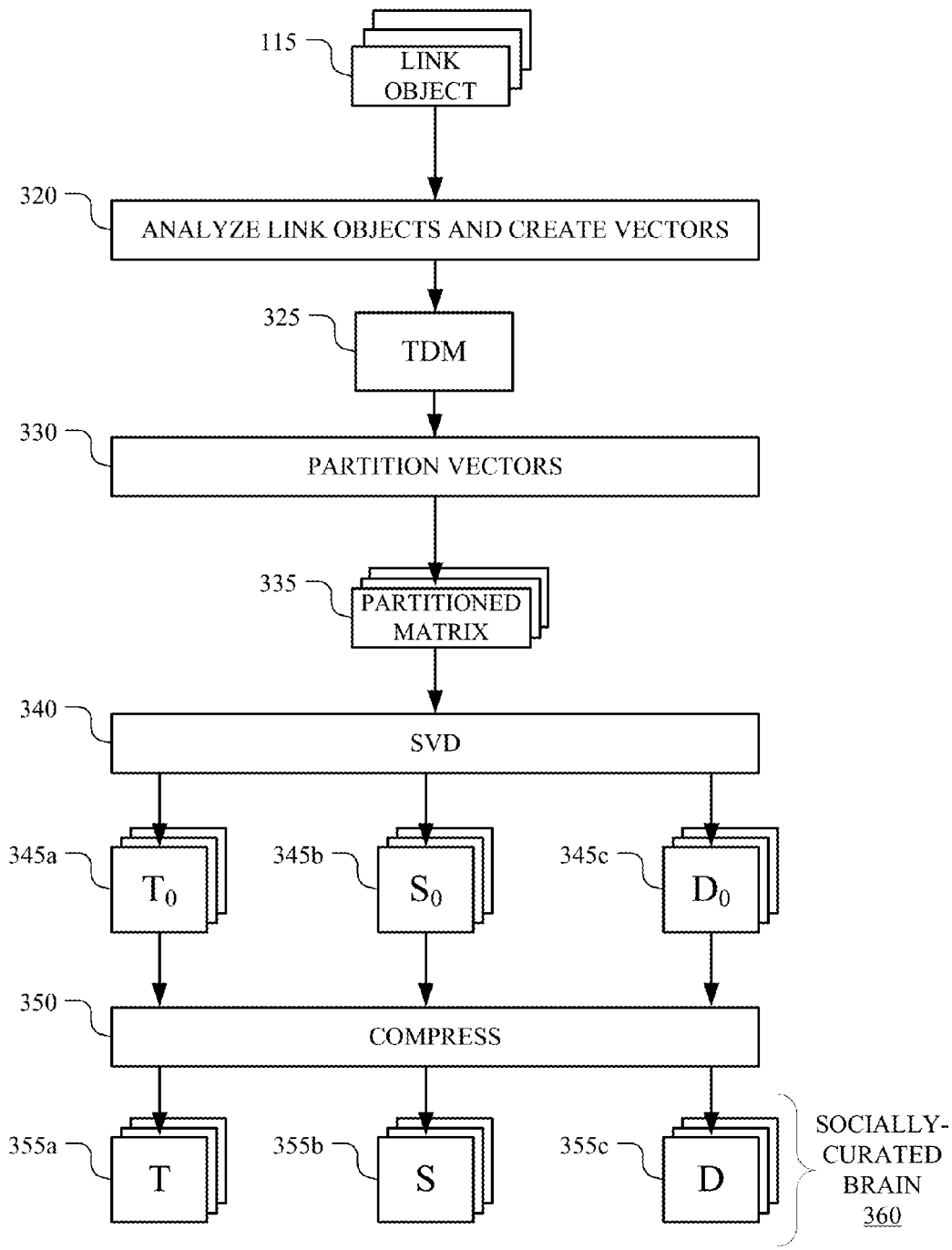
FIG. 3 illustrates a method for generating and using socially-curated brains, according to certain embodiments.

After the proper link objects 115 have been received, they may be used to generate a matrix that includes two or more vectors. A singular value representation of the matrix (i.e., a socially-curated brain) may then be generated by performing Singular Value Decomposition (SVD) on the matrix. FIG. 3, discussed below, describes certain embodiments of generating a socially-curated brain by performing SVD on a matrix formed from link objects 115.

FIG. 3 illustrates a method 300 for generating and using socially-curated brains 360. Method 300 begins in step 320, where link objects 115 are analyzed and vectors representing link objects 115 are created. In one embodiment, for example, the vectors created from analyzing each link object 115 are term vectors. The term vectors contain all of the terms and/or phrases found in link object 115 and the number of occasions the terms and/or phrases appear in link object 115. The term vectors created from each input link object 115 are then combined to create a term-document matrix ("TDM") 325 which is a matrix having all of the documents (i.e., link objects 115) on one axis and the terms found in the documents on the other axis. At the intersection of each term and document in TDM 325 is each term's weight multiplied by the number of times the term appears in the document. The term weights may be, for example, standard TFIDF term weights. It should be noted, however, that in addition to the input not being limited to documents, step 320 does not require a specific way of converting link objects 115 into vectors. Any process to convert input link objects 115 into vectors may be utilized if it is used consistently.

As discussed above, link objects 115 may be non-textual objects such as videos, music, and images. In such embodiments, TDM 325 may be formed in step 320 using various methods, including: 1) determine text for the non-textual link object 115, 2) determine non-text features of the non-textual link object 115 where these features are used like a term in TDM 325 even though the feature is not a specific word or phrase, and 3) just use the social object 110 of the associated link object 115 for processing. Each of these methods of forming TDM 325 from non-textual link objects 115 are discussed below in more detail.

First, TDM 325 may be formed in step 320 using non-textual link objects 115 by determining text for the non-textual link object 115. Examples of determining text may include one or more of the following:

Use embedded text sources like captioning or metadata.
Use automated systems such as voice recognition to create transcripts.
Find text descriptions related to the non-textual data objects 115.
Have one or more persons write a transcript of a non-textual data object 115.
Have one or more persons write a description of a non-textual data object 115.

Second, TDM 325 may be formed in step 320 using non-textual link objects 115 by determining non-text features of the non-textual link object 115 where these features are used like a term in TDM 325 even though the feature is not a specific word or phrase. Examples may include one or more of the following:

Music or any audio data object may be divided into two or more smaller segments and for each segment features for rhythm, note progressions, and other sonic features may be identified.
For images, features for basic geometric shapes, the scales these geometric shapes appear at, relative color differences, etc. may be identified.
For video, in addition to identifying audio features as described above, small segments of the video may be analyzed, image features as above for those segments may be described, and also dynamic features for how the images are changing may be described.

At a high level, something very specific such as an image, a segment of a song, or a segment of a video is analyzed and described in a more generic way with features software can identify with a practical amount of analysis. Each of these features are then treated the same way as a word or phrase in textual link objects 115, a useful vocabulary of features for a set of link objects 115 are identified, and a TDM 325 is created where "terms" could mean one of these features and "document" could be a non-textual link object 115 described by computer identified abstract features.

Third, TDM 325 may be formed in step 320 using non-textual link objects 115 by using the social object 110 of the associated link object 115 for processing. Similar to how a document may be described by the terms that appear in it, a person may be described by the social objects 110 that the person has socially interacted with, a collection of data objects by the data objects that are in the collection, or even a person by the people they have socially interacted with. For all of these descriptions the contents of the link objects 115 or the details of the person in question do not need to be known. The vocabulary or terms are the identifiers for the data objects and people that are being described with a person or social object 110.

In sum, important aspects of TDM 325 are that there is a vocabulary, and things that can be described by what parts of that vocabulary those things use and how often those things use those vocabulary parts. A simple example is a vocabulary of words and phrases, and vocabularies do not have to be limited to words and phrases. All kinds of things that are not words and phrases can be used as "terms" in the vocabulary. All that is needed is for there to be a reasonable chance that more than one data object uses the same "term", and that "term" can be usefully used in a TDM 325.

In step 330, TDM 325 is received and partitioned into two or more partitioned matrices 335. The size of TDM 325 may be directly proportional to the amount of input link objects 115. Consequently, for large amounts of input link objects 115, TDM 325 may be an unreasonable size for typical LSA processes to accommodate. By partitioning TDM 325 into two or more partitioned matrices 335 and then selecting one of partitioned matrices 335 to use for LSA, LSA becomes computationally feasible for any amount of input link objects 115 on even moderately equipped computer systems.

Step 330 may utilize any technique to partition TDM 325 into two or more partitioned matrices 335 that maximize the similarity between the data in each partitioned matrix 335. In one particular embodiment, for example, step 330 may utilize a clustering technique to partition TDM 325 according to topics.

In some embodiments, step 320 may additionally divide large input link objects 115 into smaller objects. For example, if input link objects 115 are text documents, step 320 may utilize a process to divide the text documents into "shingles". Shingles are fixed-length segments of text that have around 50% overlap with the next shingle. By dividing large text documents into shingles, step 320 creates fixed-length documents which aides LSA and allows vocabulary that is frequent in just one document to be analyzed.

In step 340, method 300 utilizes SVD to decompose each partitioned matrix 335 created in step 330 into three decomposed matrices 345: a $T_0$ matrix 345(a), an $S_0$ matrix 345(b), and a $D_0$ matrix 345(c). If link objects 115 received in step 110 are documents, $T_0$ matrices 345(a) give a mapping of each term in the documents into some higher dimensional space, $S_0$ matrices 345(b) are diagonal matrices that scale the term vectors in $T_0$ matrices 345(a), and $D_0$ matrices 345(c) provide a mapping of each document into a similar higher dimensional space. The higher dimensional space may be, for example, more than three or four dimension. Typically each term in the matrix is described with 250-350 dimensions. When using SVD, any number of dimensions from one to full dimensionality may be picked. Full dimensionality may mean that each term in a matrix would have as many dimensions as there are documents in the TDM 325.

In step 350, method 300 compresses decomposed matrices 345 into compressed matrices 355. Compressed matrices 355 may include a T matrix 355(a), an S matrix 355(b), and a D matrix 355(c) that are created by truncating vectors in each $T_0$ matrix 345(a), $S_0$ matrix 345(b), and $D_0$ matrix 345(c), respectively, into K dimensions. K is normally a small number such as 100 or 200. In LSA, T matrix 355(a) is a matrix where there is one vector for each term in the TDM that was decomposed. This is often called the Term Space. The Term Space is a K dimensional space and every term lives at some point in that space. Relationships between terms can be determined based on where they live in that space. The D matrix 355(c) in LSA is the Document space and is a K dimensional space where each document from the original TDM lives at some point in that space. The S matrix 355(b) is the singular value matrix. This is a diagonal matrix produced by SVD. Its main purpose is to provide scaling that helps translate back and forth between the document space and the term space. It is part of the math involved with comparing terms with documents or vice-versa.

In some embodiments, D matrix 355(c) is not necessarily a document matrix. The vectors in D matrix 355(c) could be for data objects (e.g., link objects 115) or social objects 110. In some embodiments, T matrix 355(a) is not necessarily terms. T matrix 355(a) could be for non-semantic features, data objects, or social objects 110.

In some embodiments, step 350 may be eliminated and T matrix 355(a), S matrix 355(b), and D matrix 355(c) may be generated in step 340. In such embodiments, step 340 may zero out portions of $T_0$ matrix 345(a), $S_0$ matrix 345(b), and $D_0$ matrix 345(c) to create T matrix 355(a), S matrix 355(b), and D matrix 355(c), respectively. This is a form of lossy compression.

After step 350, T matrix 355(a) and D matrix 355(c) may be examined along with a query to determine latent relationships in input link objects 115 and generate a results list that includes a plurality of result terms and a corresponding weight of each result term to the query. To do so, an optimal compressed matrix 355 is selected to use for the query. For example, a particular T matrix 355(a) may be examined to determine how closely the terms in the documents are related to the query. Additionally or alternatively, a particular D matrix 355(c) may be examined to determine how closely the documents are related to the query.

Step 330, along with selecting an optimal compressed matrix 355 after step 350, addresses the problems associated with typical LSA processes. FIG. 2 of U.S. patent application Ser. No. 12/263,169 (Pub. No. US 2010/0114890) and its associated description illustrate an embodiment of a method that may be implemented in step 330 to partition TDM 325. FIG. 3 of U.S. patent application Ser. No. 12/263,169 and its associated description illustrate an embodiment of a method to select an optimal compressed matrix 355 to use along with a query to produce a results list. U.S. patent application Ser. No. 12/263,169 (Pub. No. US 2010/0114890; "System and Method for Discovering Latent Relationships in Data") is hereby incorporated by reference in its entirety.

In some embodiments, matrices such as TDM 325 are too large to be efficiently processed by computer system 130. In such embodiments, various methods may be employed to perform the SVD in an acceptable amount of time. In one embodiment, computer system 130 utilizes a sample of the vectors of TDM 325 that is small enough to be processed efficiently. The remaining vectors are then projected into the space created from the sampled vectors. In another embodiment, clustering techniques may be used to cluster TDM 325. Example clustering techniques may include splitting the matrix into smaller matrices based on the clusters, recalculating the vocabulary statistics for each smaller matrix to produce a matrix with its own vocabulary, and using the new matrices to produce a library of SVD results. More details about specific clustering techniques which may used to cluster TDM 325 may be found in U.S. patent application Ser. No. 12/263,169.

The output of using SVD on TDM 325 (e.g., T matrix 355(a), S matrix 355(b), and D matrix 355(c)) is a reduced singular value representation of the vector space of TDM 325. Because TDM 325 was created using link objects 115 that were linked to by one or more social objects 110, this reduced singular value representation may be referred to as a socially-curated brain and a collection of socially-curated brains may be referred to as a brain library.

In some embodiments, one or more socially-curated brains 360 generated by computer system 130 may be used to perform specialized queries for a particular person 101 and then present results of the query using a graphical user interface. As one example, a generated socially-curated brain 360 may be used to discover people and link objects 115 of interest. Some examples of using socially-curated brain 360 in searches to discover people and link objects 115 include the following:

- Using a term space from a socially curated brain 360 to find terms. An index could then be queried to find link objects 115 related to those terms, and/or people who have socially interacted with many link objects 115 related to those terms.
- Querying a document space directly where that document space contains link objects 115.
- Creating a socially curated brain 360 that describes people in terms of link objects 115 they have socially interacted with, and then after some means of finding people or link objects of interest (possibly using 1 or 2 above) query these spaces for more people and/or link objects 115.

In certain embodiments, multiple social objects 110 may be used to query a vector space. In some embodiments, such queries may be performed by creating a single pseudo vector for social objects 110. In some embodiments, multi-concept querying may be used. More details about multi-concept querying may be found in U.S. patent application Ser. No. 13/326,284 (Pub. No. US 2013/0159313; "Multi-Concept Latent Semantic Analysis Queries") which is incorporated herein by reference in its entirety.

Figure 4:
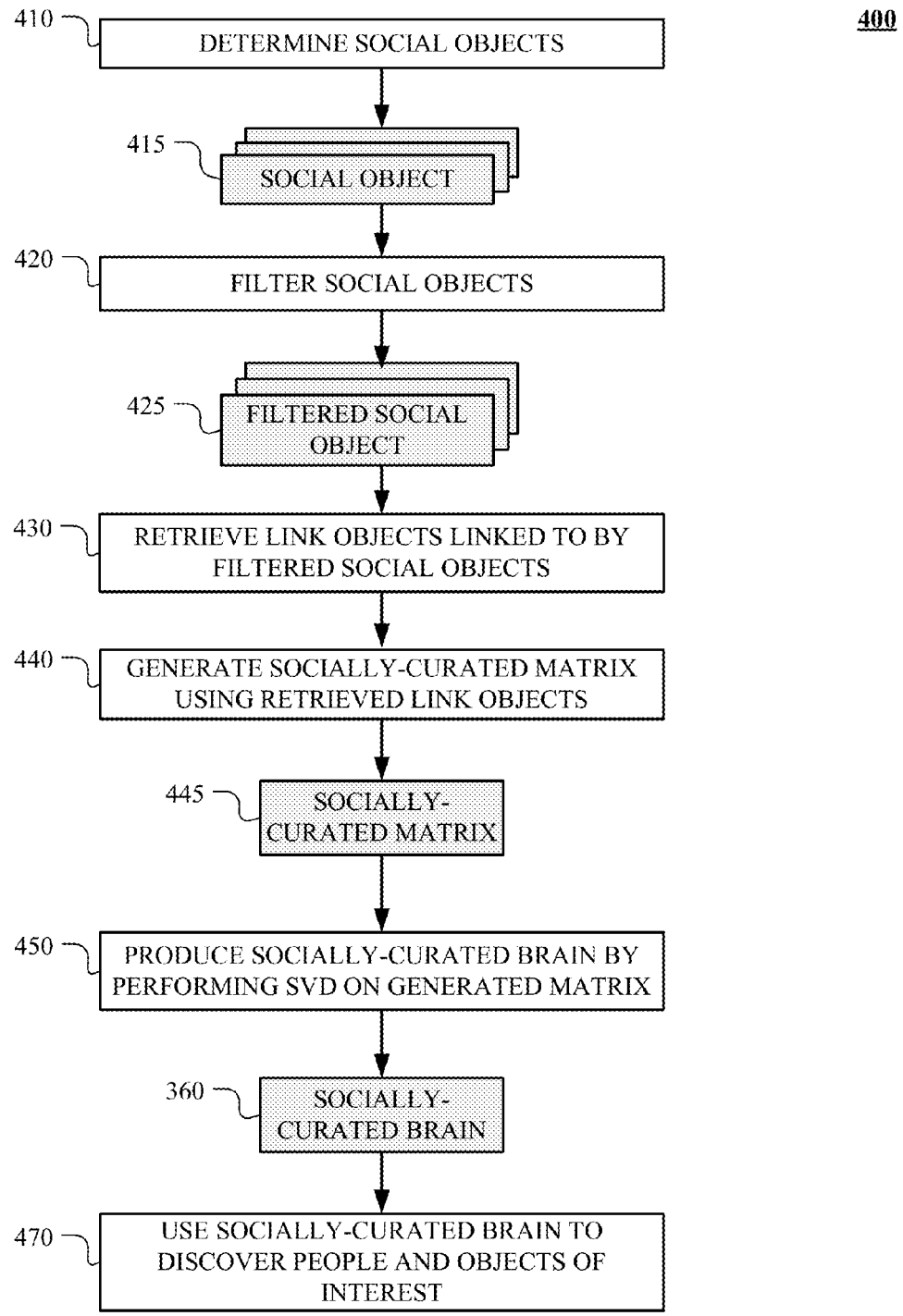
FIG. 4 illustrates another method for generating and using socially-curated brains, according to certain embodiments.

FIG. 4 illustrates a method 400 for generating and using socially-curated brains such as socially-curated brains 360. Method 400 begins in step 410 where a first group of social objects 415 are determined. In some embodiments, the social objects are social objects 110 described above. In certain embodiments, first group of social objects 415 are determined by selecting certain social objects 110 via a network such as network 120. In certain embodiments, first group of social objects 415 are determined by selecting certain social objects 110 stored in one or more memory units. In some embodiments, first group of social objects 415 are determined from a feed from a social network such as feed 111 above.

In some embodiments, first group of social objects 415 are social objects that have one or more links to other objects on the network. In some embodiments, the links may refer to links 112 above. In some embodiments, the other objects on the network may refer to link objects 115 above and may include webpages, PDF documents, text documents, posts to social-media websites, and the like. The network may be the Internet, a corporate network, or any other appropriate network.

In some embodiments, first group of social objects 415 are social objects such as tweets that are associated with a particular group of users. For example, the particular group of users may be the topmost number or percentage of users of a social-network according to number of connections on the social-network and/or according to amount of interaction with the social-network.

In step 420, a filter is applied to first group of social objects 415 in order to determine a plurality of filtered social objects 425. In some embodiments, the filter applied in step 420 is any appropriate filter such as the filters described above. For example, the filter may include selecting social objects that have been re-posted a predetermined number of times, selecting social objects with links to link objects that have been linked to in other social objects a predetermined number of times, selecting social objects that have been up-voted or liked a predetermined number of times, selecting social objects that have been shared a predetermined number of times, or selecting social objects associated with a predefined topmost percentage of users of a social network according to number of social connections within the social network. In some embodiments, the filter may include selecting social objects that have one or more links to link objects on the network.

In step 430, a copy of each of the link objects linked to by filtered social objects 425 are retrieved. In some embodiments, the copies of the link objects are retrieved and stored in one or more memory units.

In step 440, a socially-curated matrix 445 is generated using the copies of the link objects that are linked to by filtered social objects 425. In some embodiments, socially-curated matrix 445 is TDM 325 described above. Socially-curated matrix 445 generated in step 440 includes one or more vectors such as term vectors.

In step 450, a socially-curated brain 360 is generated by performing SVD on socially-curated matrix 445. Socially-curated brain 360 is a singular value representation of socially-curated matrix 445. In some embodiments, step 450 includes the SVD operations described above in reference to FIG. 3. In some embodiments, socially-curated brain 360 is stored in one or more memory units.

In step 470, socially-curated brain 360 may be used to provide results to a user query. For example, socially-curated brain 360 may be used to discover people and objects of interest with respect to a user query, as described above. In some embodiments, the results may be presented using a GUI. After step 470, method 400 may end.

Figure 5:
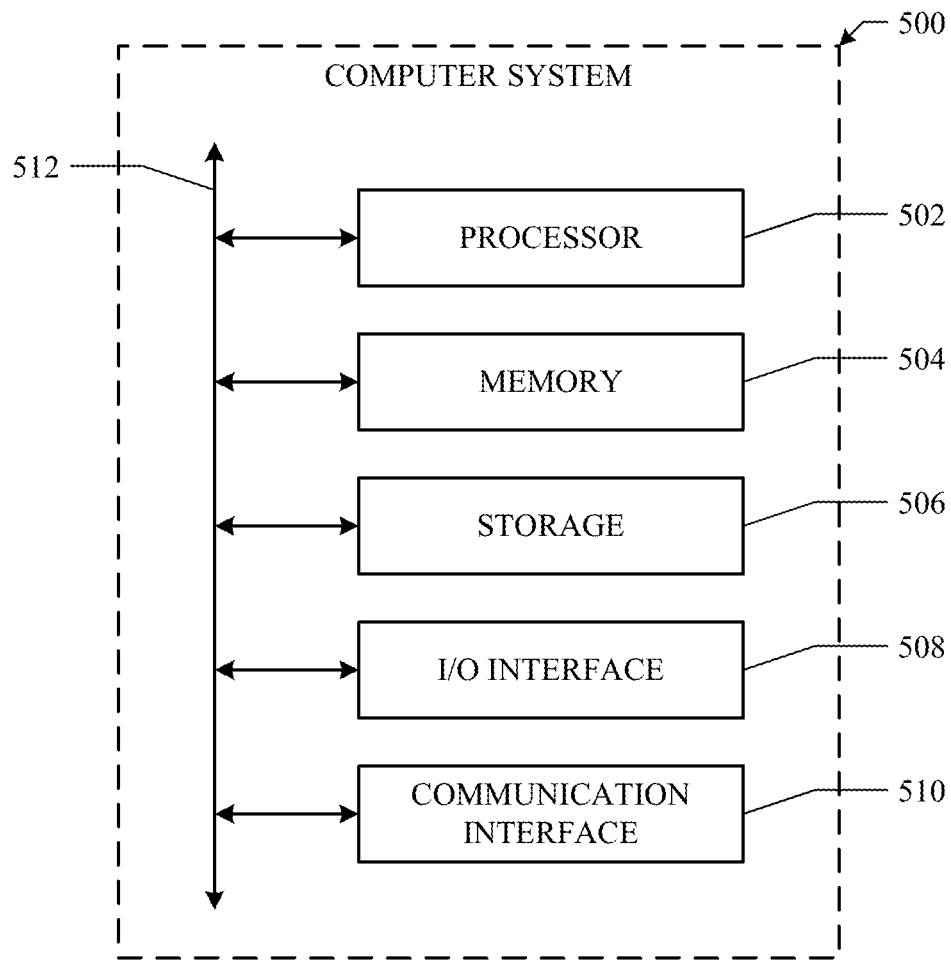
FIG. 5 is a computer system where particular embodiments of the disclosure may be implemented.

FIG. 5 illustrates an example computer system 500. Computer system 500 may be utilized by computer system 130 and client system 140 of FIG. 1. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis. The operations of computer system 500 may be performed by more, fewer, or other components. Additionally, operations of computer system 500 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
   one or more memory units operable to store a plurality of tweets; and
   one or more processing units operable to:
   determine, from the stored plurality of tweets, a first group of tweets, each tweet of the first group of tweets comprising a link to a link object on the Internet;
   apply a filter to the first group of tweets in order to determine a plurality of filtered tweets;
   retrieve a copy of each of the link objects linked to by the plurality of filtered tweets;
   generate, using the retrieved copies of the link objects linked to by the plurality of filtered tweets, a matrix comprising a plurality of vectors;
   produce a singular value representation of the matrix by performing Singular Value Decomposition (SVD) on the matrix;
   store the singular value representation of the matrix in the one or more memory units; and
   perform a query using at least a portion of the singular value representation of the matrix:
   wherein applying the filter to the first group of tweets in order to determine the plurality of filtered tweets comprises:
   selecting tweets from the first group of tweets that include links to link objects that have been linked to by a predetermined number of other tweets; and selecting tweets from the first group of tweets that have been retweeted a predetermined number of times or have been retweeted by a predetermined number of users.

2. The system of claim 1, wherein the link objects comprise one or more of:
webpages;
Portable Document Format (PDF) documents;
text documents;
posts to social-media websites;
videos;
music; and
images.

3. The system of claim 1, wherein the plurality of tweets are retrieved using a feed from a social-networking website.

4. A computer-implemented method, comprising:
determining a plurality of social objects, each social object comprising a link to a link object on a network;
applying a filter to the determined social objects in order to determine a plurality of filtered social objects;
retrieving a copy of each of the link objects linked to by the plurality of filtered social objects;
generating, using the retrieved copies of the link objects linked to by the plurality of filtered social objects, a matrix comprising a plurality of vectors;
generating a singular value representation of the matrix by performing Singular Value Decomposition (SVD) on the matrix;
storing the singular value representation of the matrix in one or more memory units; and
performing a query using at least a portion of the singular value representation of the matrix;
wherein applying the filter to the determined social objects in order to determine the plurality of filtered social objects comprises:
selecting social objects with links to link objects that have been linked to in other social objects a first predetermined number of times; and
selecting social objects that have been re-posted a second predetermined number of times or have been re-posted by a predetermined number of users.

5. The computer-implemented method of claim 4, wherein the plurality of social objects comprises one or more of:
tweets;
messages associated with a corporate network;
posts to a social-network; and
blogs.

6. The computer-implemented method of claim 4, wherein the network comprises one of:
the Internet; and
a network of a corporation.

7. The computer-implemented method of claim 4, further comprising:
presenting results of the query to a user using a graphical user interface.

8. The computer-implemented method of claim 4, wherein applying the filter to the determined social objects in order to determine the plurality of filtered social objects further comprises one or more of:
selecting social objects that have been up-voted or liked a third predetermined number of times;
selecting social objects that have been shared a fourth predetermined number of times; and
selecting social objects associated with a predefined topmost percentage of users of a social network according to number of social connections within the social network.

9. The computer-implemented method of claim 4, wherein the link objects comprise one or more of:
webpages;
Portable Document Format (PDF) documents;
text documents;
posts to social-media websites;
videos;
music; and
images.

10. The computer-implemented method of claim 4, wherein the plurality of social objects are determined from a feed from a social network.

11. A non-transitory computer-readable medium comprising software, the software when executed by one or more processing units operable to perform operations comprising:
determining a plurality of social objects, each social object comprising a link to a link object on a network;
applying a filter to the determined social objects in order to determine a plurality of filtered social objects;
retrieving a copy of each of the link objects linked to by the plurality of filtered social objects;
generating, using the retrieved copies of the link objects linked to by the plurality of filtered social objects, a matrix comprising a plurality of vectors;
generating a singular value representation of the matrix by performing Singular Value Decomposition (SVD) on the matrix;
storing the singular value representation of the matrix in one or more memory units; and
performing a query using at least a portion of the singular value representation of the matrix;
wherein applying the filter to the determined social objects in order to determine the plurality of filtered social objects comprises:
selecting social objects with links to link objects that have been linked to in other social objects a first predetermined number of times; and
selecting social objects that have been re-posted a second predetermined number of times or have been re-posted by a predetermined number of users.

12. The non-transitory computer-readable medium of claim 11, wherein the plurality of social objects comprises one or more of:
tweets;
messages associated with a corporate network;
posts to a social-network; and
blogs.

13. The non-transitory computer-readable medium of claim 11, wherein the network comprises one of:
the Internet; and
a network of a corporation.

14. The non-transitory computer-readable medium of claim 11, further comprising:
presenting results of the query to a user using a graphical user interface.

15. The non-transitory computer-readable medium of claim 11, wherein applying the filter to the determined social objects further comprises one or more of:
selecting social objects that have been up-voted or liked a third predetermined number of times; and
selecting social objects that have been shared a fourth predetermined number of times.

16. The non-transitory computer-readable medium of claim 11, wherein the link objects comprise one or more of:
webpages;
Portable Document Format (PDF) documents;
text documents;

posts to social-media websites;
videos;
music;
images.

17. The non-transitory computer-readable medium of claim 11, wherein the plurality of social objects are determined from a feed from a social network.

18. The non-transitory computer-readable medium of claim 11, wherein:
- the plurality of social objects are associated with a plurality of users of a social network; and
- applying the filter to the determined social objects further comprises selecting social objects associated with a pre-defined topmost percentage of users of the social network according to number of social connections within the social network.

* * * * *